Feb. 8, 1944.  L. B. BRAGG  2,340,860
APPARATUS FOR ELECTRIC RESISTANCE WELDING
Filed Feb. 21, 1941  8 Sheets-Sheet 1

INVENTOR
LESLIE B. BRAGG
BY
ATTORNEY

Feb. 8, 1944.　　　　　L. B. BRAGG　　　　　2,340,860
APPARATUS FOR ELECTRIC RESISTANCE WELDING
Filed Feb. 21, 1941　　　8 Sheets-Sheet 3

INVENTOR
LESLIE B. BRAGG
BY
ATTORNEY

Feb. 8, 1944. L. B. BRAGG 2,340,860
APPARATUS FOR ELECTRIC RESISTANCE WELDING
Filed Feb. 21, 1941 8 Sheets-Sheet 4
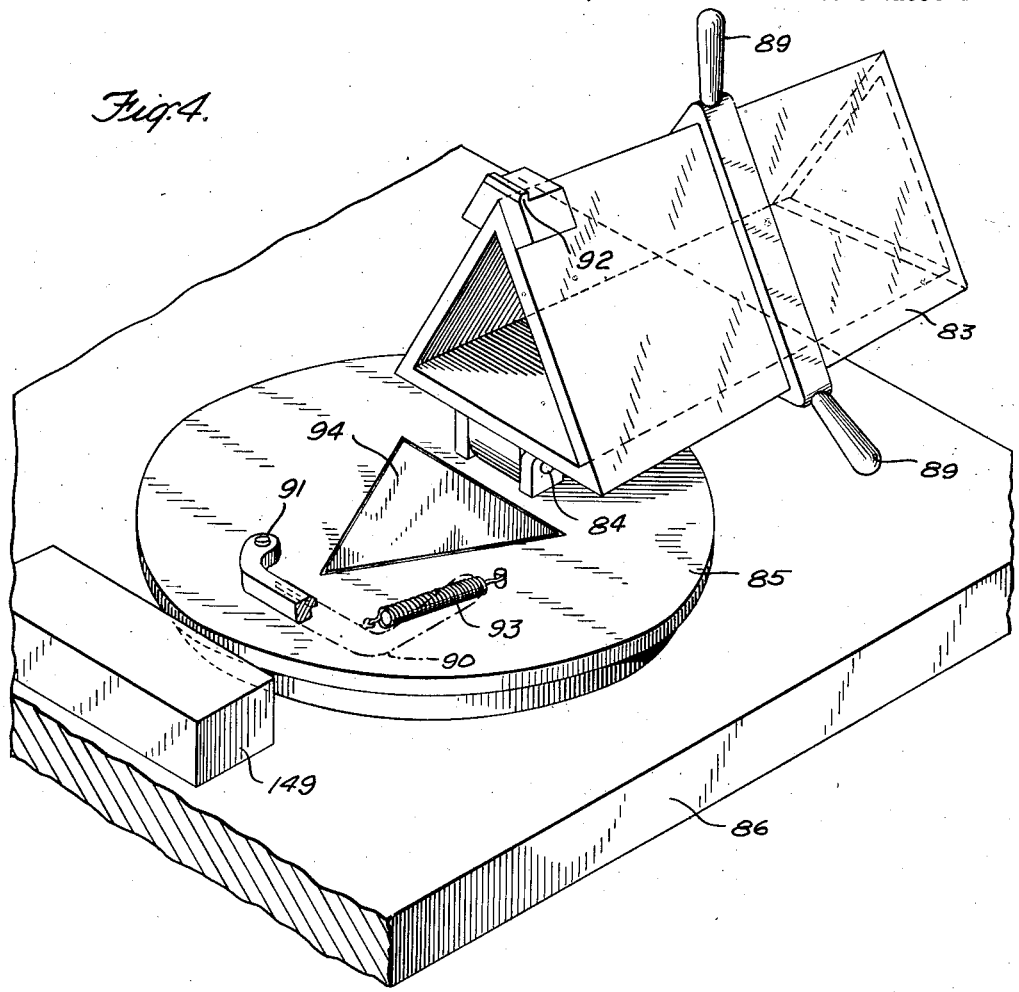
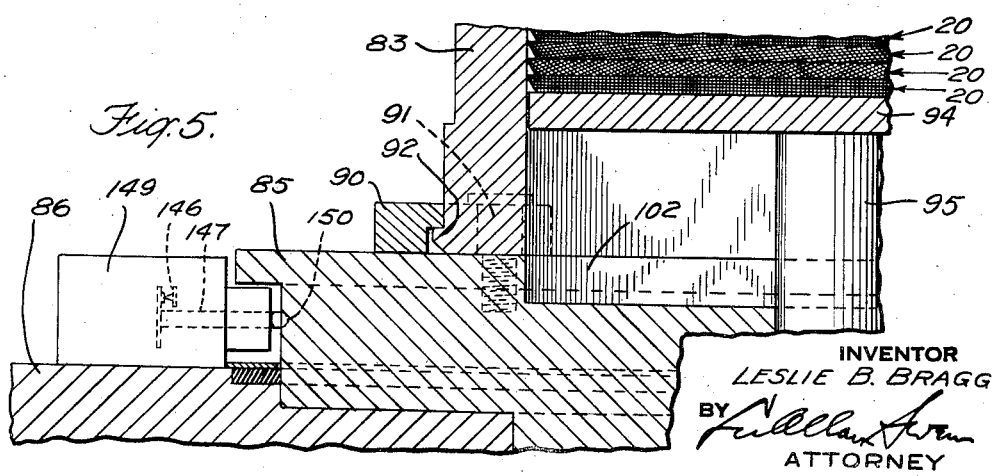
INVENTOR
LESLIE B. BRAGG
BY
ATTORNEY

INVENTOR
LESLIE B. BRAGG.
BY
ATTORNEY

Feb. 8, 1944. L. B. BRAGG 2,340,860
APPARATUS FOR ELECTRIC RESISTANCE WELDING
Filed Feb. 21, 1941 8 Sheets-Sheet 6

INVENTOR
LESLIE B. BRAGG
BY
ATTORNEY

Feb. 8, 1944.  L. B. BRAGG  2,340,860
APPARATUS FOR ELECTRIC RESISTANCE WELDING
Filed Feb. 21, 1941  8 Sheets-Sheet 7

INVENTOR
LESLIE B. BRAGG
BY
ATTORNEY

Feb. 8, 1944.   L. B. BRAGG   2,340,860
APPARATUS FOR ELECTRIC RESISTANCE WELDING
Filed Feb. 21, 1941   8 Sheets-Sheet 8

INVENTOR
LESLIE B. BRAGG.
BY
ATTORNEY

Patented Feb. 8, 1944

2,340,860

UNITED STATES PATENT OFFICE 2,340,860

APPARATUS FOR ELECTRIC RESISTANCE WELDING

Leslie B. Bragg, Scotch Plains, N. J., assignor to Foster Wheeler Corporation, New York, N. Y., a corporation of New York Application February 21, 1941, Serial No. 379,946

20 Claims. (Cl. 219—4)

This invention relates to welding and more particularly pertains to electric resistance welding.

The invention provides novel apparatus for the electric resistance welding of articles at a multiplicity of points simultaneously.

The invention will be understood from the following description when considered in connection with the accompanying drawings forming a part thereof, and in which:

Fig. 4 is an isometric view, on an enlarged scale, of the work holding means;

Fig. 5 is a vertical sectional view, on an enlarged scale, of part of the work holding means;

Like characters of reference refer to the same or to similar parts throughout the several views.

Figure 10:
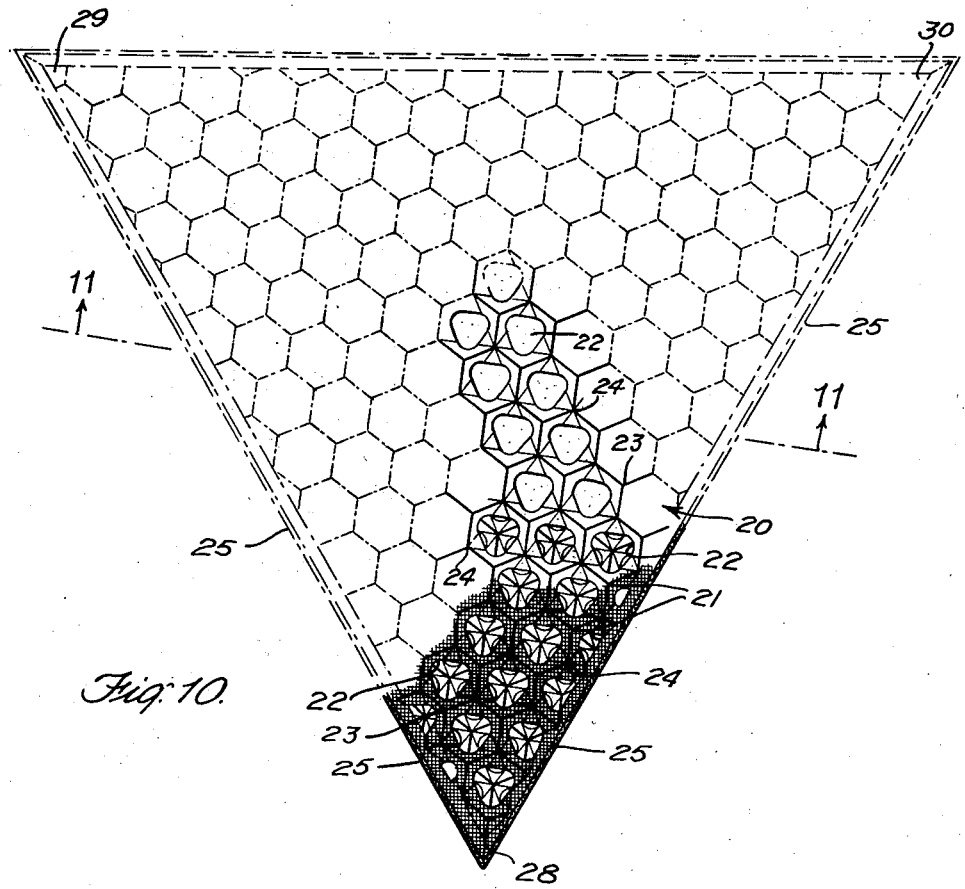
Fig. 10 is a top plan view of a triangular shaped unit of wire mesh packing for vapor and liquid contact apparatus which may be welded at a plurality of points simultaneously in accordance with the invention.
Figure 11:
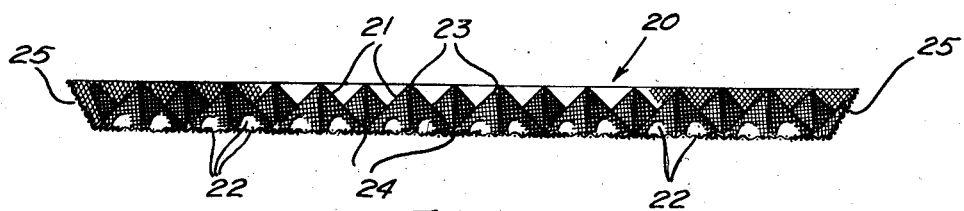
Fig. 11 is a transverse sectional view on line 11—11 of Fig. 10.
Figure 12:
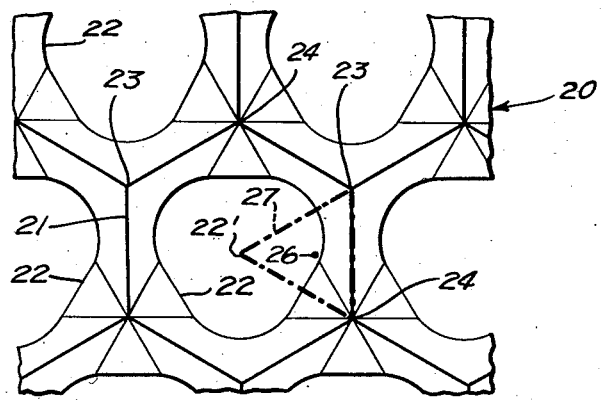
Fig. 12 is a top plan view, on an enlarged scale, of the geometrically central portion of the unit shown in Fig. 10.

The invention will be disclosed as applied to the resistance welding of units of wire mesh packing of the character shown in Figs. 10 to 12, although it will be understood that the invention is not limited to this application, but is applicable to the resistance welding generally of metal articles of any shape at a plurality of points simultaneously. Packing of the type mentioned, will be referred to herein and in the claims as "capillary material," which means a metallic material having a plurality of spaced openings of such size that they will seal completely with liquid being treated in the vapor and liquid contact apparatus packed with the capillary material. Woven wire of any suitable metal or alloy is a satisfactory capillary material provided the mesh openings are small enough to seal with the liquid under treatment.

Figure 6:
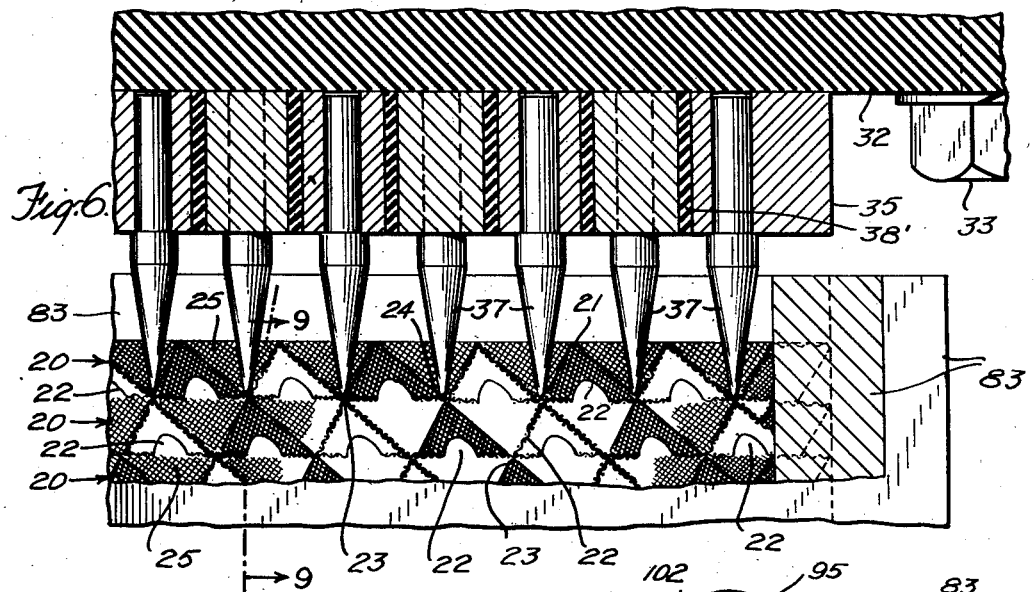
Fig. 6 is a vertical sectional view taken on line 6—6 of Fig. 1.
Figure 9:
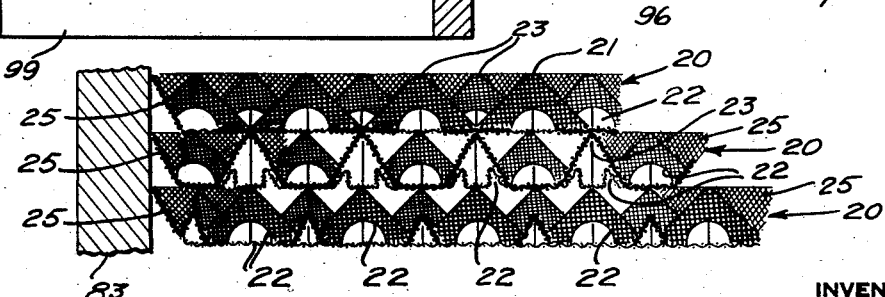
Fig. 9 is a vertical sectional view taken on line 9—9 of Fig. 6.

Referring to Figs. 6, 9, and 10 to 12 of the drawings, equilateral triangular wire mesh units 20 are welded together in superposed relationship as illustrated in Figs. 6 and 9, to provide packing sections, a plurality of which are grouped together with their sides contiguous to form a packing of desired flow area and having an overall configuration of a parallelogram, triangle, hexagon, or an irregular configuration, as disclosed in my copending application Serial No. 373,909, filed January 10, 1941, now Patent No. 2,290,162, dated July 21, 1942.

In the form shown, each unit 20 of packing is shaped or formed to provide a plurality of uniformly disposed pyramids 21, the pyramids being arranged in parallel rows, with those in adjacent rows being disposed in staggered relationship, and a plurality of vapor openings 22, each at the base portion of three adjacent pyramids. The pyramids and vapor openings are substantially regularly disposed on each unit. The vapor openings are larger than the mesh openings of the metal gauze and are of sufficient size so as not to seal with the liquid under treatment. The units are all alike with respect to the pattern, or arrangement, of the pyramids and openings, and in assembling them into a packing section, the units are disposed so that the vapor openings 22 are out of vertical alignment and the apices 23 of the pyramids 21 of each unit are in vertical alignment and in contact with the points of junction 24 of each group of three adjacent pyramids on the unit next above. To prevent the liquid flowing downwardly through the sections from reaching the wall of the casing or column surrounding the packing, the peripheral portion of each unit is turned upwardly to provide a vertically inclined lip 25, preferably having substantially the same height as the pyramids 21 and substantially the same inclination to the horizontal as the sides of the pyramids. The upper edge of the lip 25 will be in contact with the inner wall of the casing or column, or with the lips 25 of contiguous units.

The pattern on each unit, or the arrangement of the pyramids and vapor openings thereon, is centered with respect to the unit, in order that the units may be assembled with the apices 23 of the pyramids on one unit in engagement with the junction points 24 of the unit next above and with the vapor openings in the packing out of vertical alignment, by rotating each successive unit 120° about its geometric center with respect to the next preceding unit as it is added to the packing previously formed. To this end, the geometric center 26 of the unit is found and the three elements of the packing unit, that is, the apex 23 of a pyramid, the junction point 24 between three adjacent pyramids 21, and the center 22' of the vapor opening 22, are placed equidistantly about this center at the corners of an equilateral triangle 21. The size of the triangle 21 will be governed by the size of the pyramids 21. Having determined the position of the three elements of the packing, the pattern is completed by providing parallel rows of pyramids with the pyramids in each row substantially equally spaced and with the pyramids in adjacent rows staggered with respect to each other, and with the vapor openings intermediate the bases of each group of three adjacent pyramids. With the pattern thus centered on the packing unit, the packing may be fabricated readily from a plurality of these units to provide a multiplicity of substantially cubical cells extending throughout the packing. This is accomplished by starting the packing with one unit in the position of the unit 20 in Fig. 10 for example, placing a second unit upon the first unit in such position that the pattern is at an angle of 120° to the pattern of the first unit, that is to say, with the corner 29 of the second unit above the corner 28 of the first unit, and with the points of junction 24 of the second unit in engagement with the apices 23 of the pyramids of the first unit, then placing a third unit upon the second unit with its pattern at an angle of 120° to the pattern of the second unit, or with the corner 30 of the third unit above the corner 29 of the second unit, and with the points of junction 24 of the third unit in engagement with the apices 23 of the pyramids of the second unit, then placing a fourth unit upon the third unit with its pattern in vertical alignment with the pattern of the first unit, that is to say, with the corner 28 of the fourth unit above the corner 28 of the first unit and above the corner 30 of the third unit, and with the points of junction of the fourth unit in engagement with the apices of the pyramids of the third unit, and so on in the same order and manner until the desired height of packing is obtained. With the packing arranged in this manner, the vapor openings in every third unit only are in vertical alignment and each vapor opening is disposed immediately below and in alignment with the apex of a pyramid and is immediately above and in alignment with a point of junction 24 of three adjacent pyramids. A plurality of substantially cubical cells thus are formed throughout the packing, with each cell having a vapor inlet opening at its base and three spaced outlet openings, one in each of the three adjacent sides forming the upper portion of the cell. Each cell thus is fed with vapor from each of three similar cells immediately below each cell.

The pattern of pyramids on the packing units preferably is die-formed from a sheet of metal wire gauze after the vapor openings have been stamped out of the gauze. In order to avoid breakage of the wires of the gauze during formation of the pattern and to avoid waste of the gauze, the pattern is disposed so that the rows of pyramids and vapor openings are at an acute angle to the sides of the units, as will be perceived from an inspection of Fig. 10. The angle at which the rows of pyramids are disposed to the sides of the unit, or the extent to which the pattern of the unit is rotated about the center 26 with respect to the sides of the unit, is such that the filling wires of the gauze extend at an angle to all of the ridges of the pyramids but not at a right angle or substantially at a right angle thereto. As shown in Fig. 10, the rows of pyramids on the packing units extend approximately at an angle of 7½° to the edges of the units. With the pattern thus positioned on the unit, the pyramids may be die-formed from the gauze without breaking the wires thereof, and an edge of the die may be positioned in alignment with a longitudinal edge of the gauze sheet, and thereby avoid any waste of the gauze material. It will be understood that if an edge of the die had to be placed at an angle to the longitudinal edge of the gauze sheet to position the filling wires at acute angles to the ridges of the pyramids to prevent breakage of the wires, triangular pieces of the gauze material necessarily would be wasted.

The packing units are secured together in superposed relationship, by resistance welding simultaneously the apices 23 of the pyramids on each unit to the junction points 24 on the unit next above in accordance with the invention. This is accomplished, in this particular instance, by providing a plurality of welding electrodes on a single welding head, one electrode for each point to be welded on the packing unit 20, located so that they will simultaneously engage all of the points of junction 24 of the packing unit 20 which is to be welded to a similar packing unit disposed below and with its apices 23 in contact with the said points of junction, it being understood that the pattern on the lower packing unit is disposed at an angle of 120° to the pattern in the uppermost unit, as has been described previously, and connecting alternate single or double rows of electrodes to one side of the welding circuit and the other rows to the other side of the circuit. Inasmuch as the pyramids on the packing unit are uniformly arranged on the packing unit 20, the apices 23 and the points of junction 24 will be uniformly arranged or spaced also, and the welding electrodes will be arranged or spaced uniformly. Hence the welding electrodes which are connected to one side of the welding circuit will be adjacent to, and uniformly spaced from, the electrodes which are connected to the other side of the circuit, with the result that the welding current will be distributed uniformly among the welding electrodes so that each electrode will receive substantially its proportionate part of the current and all the points will be welded simultaneously.

Figure 1:
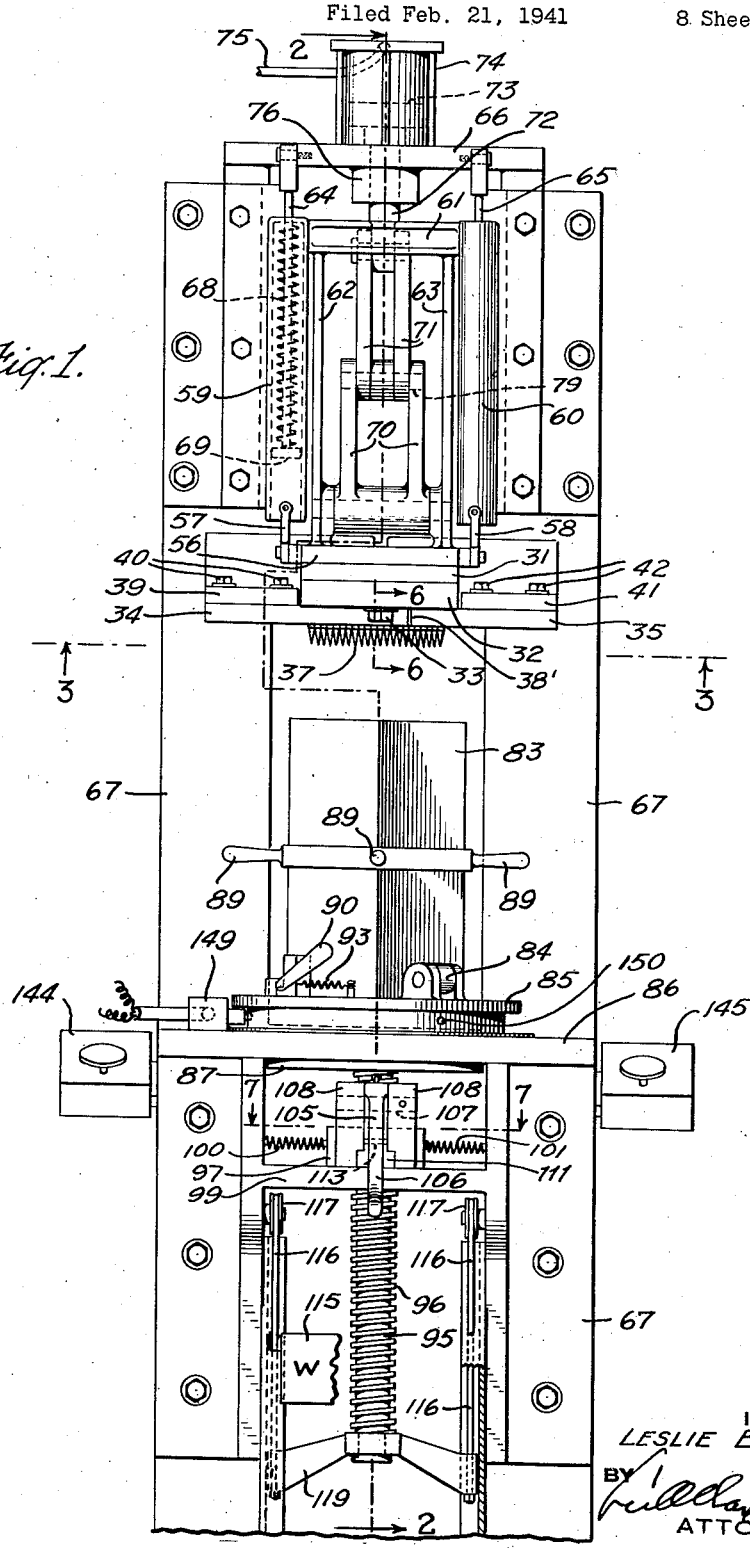
Fig. 1 is a front elevational view of a welding machine embodying the invention.
Figure 2:
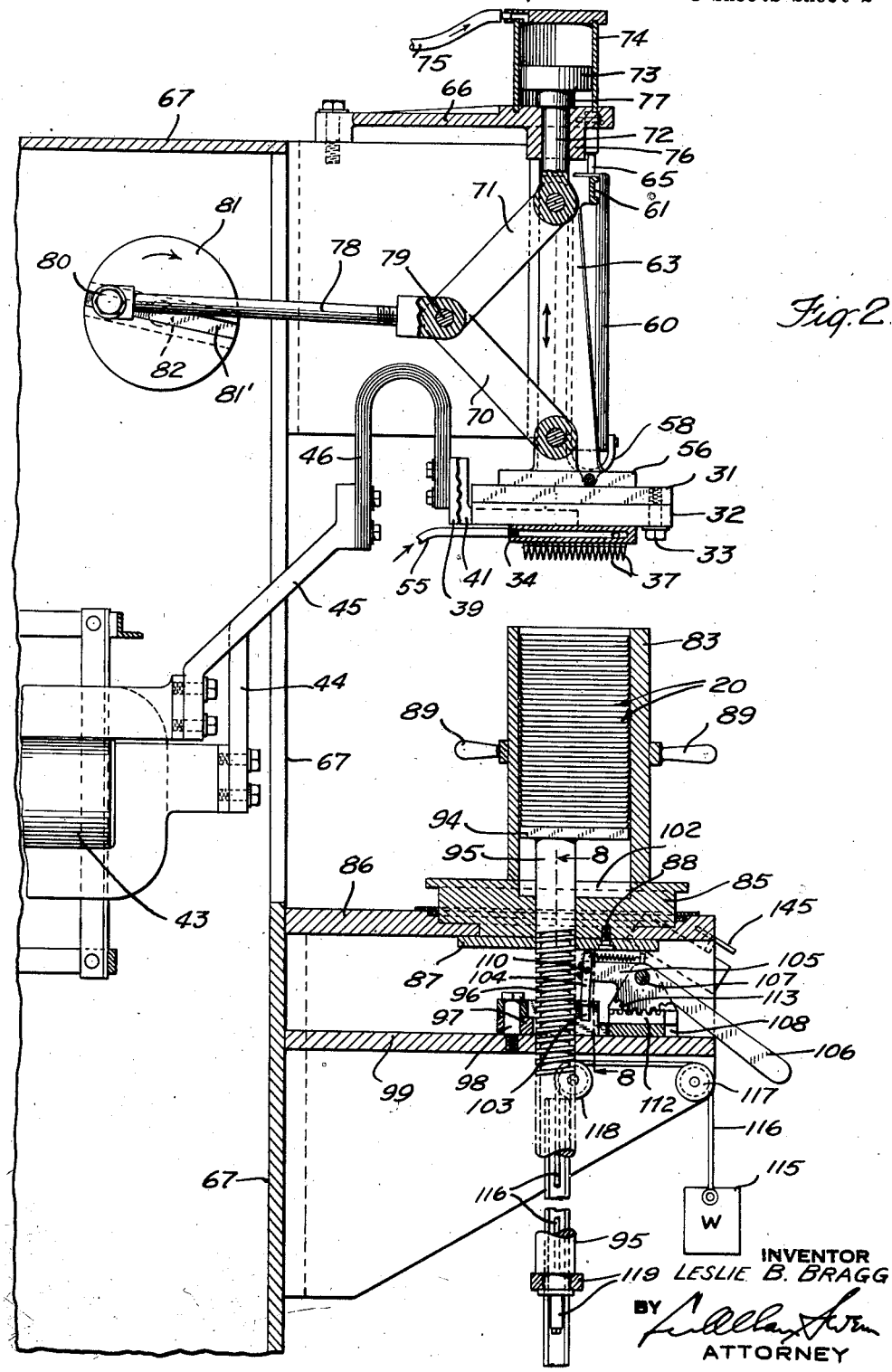
Fig. 2 is a vertical sectional view taken on line 2—2 of Fig. 1.
Figure 3:
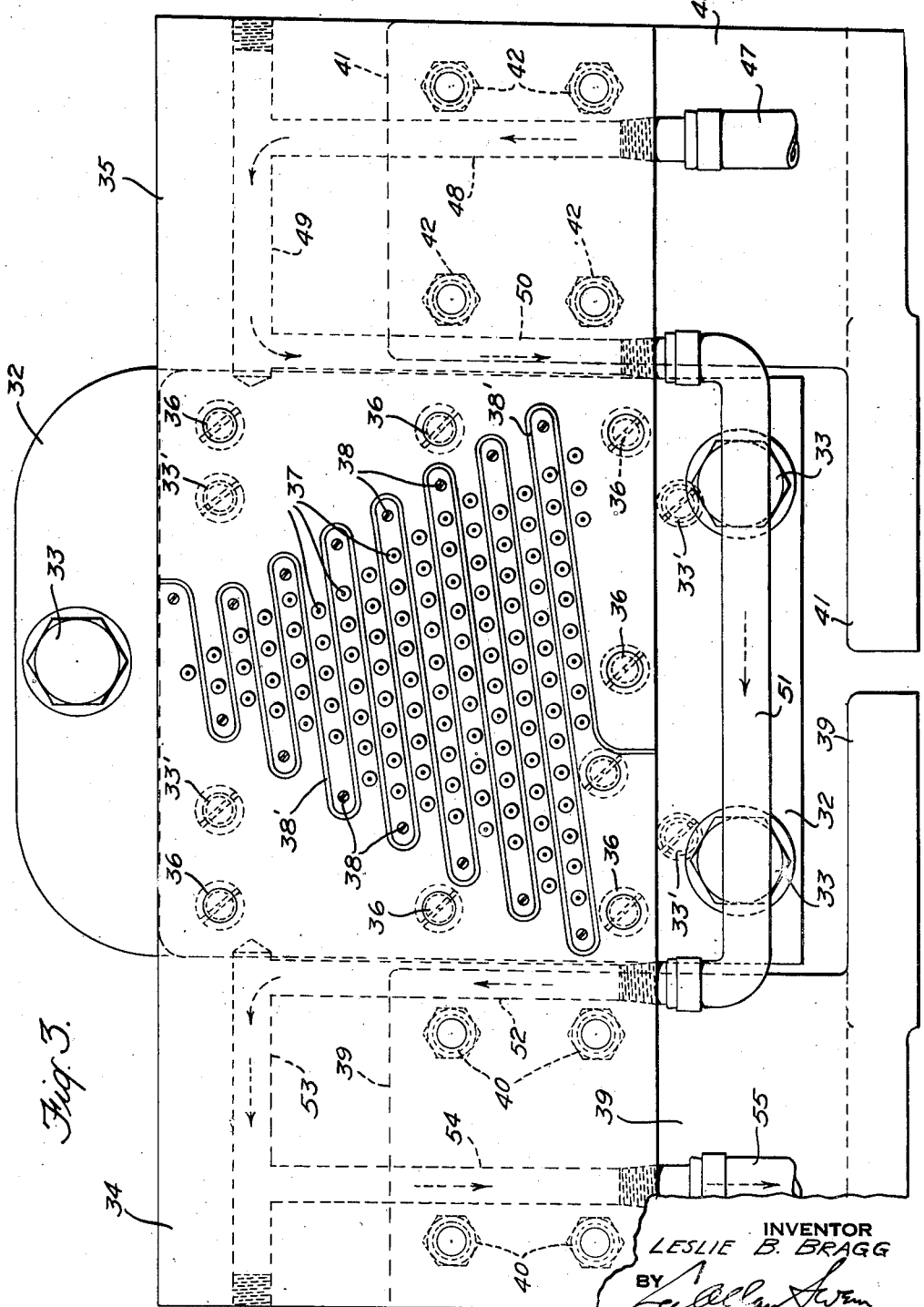
Fig. 3 is a transverse sectional view taken on line 3—3 of Fig. 1.

One form of welding head suitable for the purpose is shown in Figs. 1, 2, 3, and 6. The head comprises a steel mounting plate 31 to the underside of which is secured by bolts 33 an electric insulating block 32 of Bakelite or other suitable material for the purpose, copper die blocks 34 and 35 secured to the insulating block 32 by bolts 36, and a plurality of copper or copper alloy welding electrodes 37 which are firmly seated in cylindrical shaped apertures in the die blocks. The electrodes 37 have tapered lower ends as shown more clearly in Fig. 6 with a relatively small work contacting area, and they are arranged and disposed so that their lower ends will come in contact with the points of junction 24 between groups of three adjacent pyramids on the packing unit. Alternate rows of electrodes 37 are mounted on die block 34 and the other rows of electrodes are mounted on die block 35. To this end, the die blocks are provided with spaced, parallel, relatively narrow, elongated extensions, arranged and disposed so that the extensions on one die block fit between the extensions on the other die block and in spaced relationship thereto as shown in Fig. 3. The outer ends of the extensions are secured to the insulating block 32 by cap screws 38. Preferably the space between the die blocks and the extensions thereon is filled with an insulating material 38' such as paper, or the like. A copper connecting plate 39 is secured to the die block 34 by bolts 40, and a copper connecting plate 41 is secured to die block 35 by bolts 42. The plates 39 and 41 are connected to opposite sides of the secondary circuit of a transformer 43 which is suitably supported on the framework of the machine, through bus bars 44 and 45 and flexible connections 46 only one of which is shown in Fig. 2. To dissipate some of the heat generated by the welding current in passing through the die blocks, they are provided with passages for a cooling fluid such as water. As shown, the fluid enters the die block 35 through a conduit 47 and flows through connected passages 48, 49 and 50, thence through connecting conduit 51 into and through passages 52, 53 and 54 in die block 34 and out through conduit 55.

The welding head is mounted for vertical rectilinear reciprocatory movement so that the welding electrodes may be moved into and out of contact with the work as the packing units are welded together. As shown, mounting plate 31 of the welding head is secured by screws 33' to the underside of a head support plate 56 to opposite sides of which are pivotally connected U-shaped shackles 57 and 58, between the upper end portions of the legs of which are pivotally secured cylindrical members 59 and 60 respectively, each of which is closed at its upper end and is open at its lower end. A beam 61 extends horizontally between the upper ends of columns 62 and 63 which extend vertically between the member 61 and the plate 56 adjacent the members 59 and 60. Rods 64 and 65 are pivotally secured at their upper ends to a member 66 which forms part of the framework 67 of the machine. These rods extend through openings in the upper ends of the cylindrical members 59 and 60, respectively, and on each rod is a coil spring 68, the lower end of which bears against a stop 69 on the bottom of the rod, and the upper end of which bears against the upper end of the cylinder within which it is carried. Thus the welding head is resiliently supported on the springs 68 which are supported from the framework of the machine.

A toggle joint is utilized to move the welding head into contact with the work against the action of the supporting spring 68. As illustrated, the toggle joint includes links 70 and 71. Link 70 is pivotally connected at its lower end to the support plate 56, and link 71 is pivotally connected at its upper end to the lower end of a piston rod 72 carrying on its upper end a piston 73 which moves in a cylinder 74 to which air under pressure of about 35 pounds per square inch is introduced through air line 75. The piston rod has a bearing in member 66 and in a boss 76 thereon. A spacing sleeve 77 on the piston rod, limits the downward movement of the piston. The toggle joint is operated by an operating rod 78, Figs. 2 and 13, one end of which is pivotally connected at 79 to the connected ends of the links 70 and 71, and the other end of which is rotatably mounted on a crank pin 80 which is adjustably secured to a disc 81 mounted on one end of a driven shaft 82, the pin 80 being capable of being positioned at any desired point in the diametrically disposed slot 81'. With this arrangement, each complete revolution of the disc 81 on its shaft will result in movement of the electrodes 37 into and out of contact with the work. The piston 73 will rest upon spacing sleeve 77 until the time the electrodes engage the work, when the piston will move upwardly a short distance against the pressure of the air in the cylinder, so that at the time the welds are made, the pressure on the electrodes will be distributed substantially uniformly among the electrodes, and the pressure in each packing unit as it is welded will be approximately the same as on all the other units.

The work holding means is arranged so as to be rotatable with respect to the welding head in order that the packing units when placed in the holding means in the same position relative to the welding head, will be superposed upon each other in the proper relative position for the packing as previously described. As illustrated, the packing units 20 are placed in an elongated holder 83 of equilateral triangular shaped transverse cross-section having inner dimensions sufficient to receive fairly snugly a packing unit when placed horizontally therein as shown in Fig. 2. The holder 83 is open at both ends and is pivotally connected at 84 to the upper central portion of a turntable 85 which rests upon a table 86 of the machine framework 67, and is retained thereon in rotatable position by a circular plate 87 which is secured to the underside of the turntable by screws 88. A handle 89 at each corner of the holder 83 provides means for rotating the holder manually about its own axis. The holder is retained in its upright position on the turntable 85 by means of a latch 90 which is pivoted at 91 at one end thereof so as to be movable in a horizontal plane, and which engages a keeper 92 on the lower end of the holder. A coil spring 93 urges the latch into locking position as shown in Fig. 1.

Figures 7, 8:
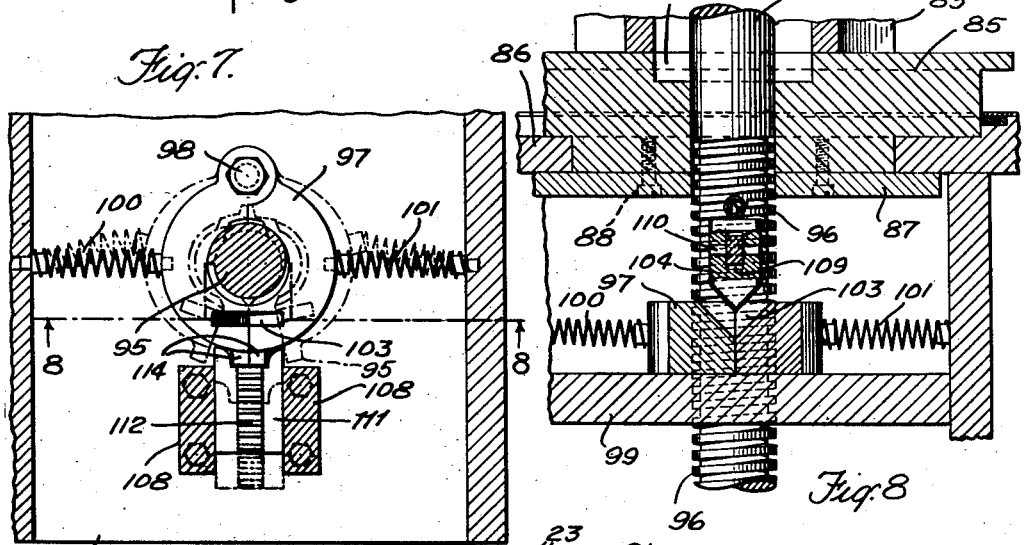
Fig. 7 is a horizontal sectional view taken on line 7—7 of Fig. 1.
Fig. 8 is a vertical sectional view taken on line 8—8 of Fig. 7.

The packing units when placed in the holder 83, rest upon a platform 94 which is equilateral triangular in shape and is freely movable within the holder 83. The platform is supported on the upper end of a rod 95 provided with screw threads 96, the rod being rotatable in a split nut 97, the two cooperating parts of which are pivotally connected on a pin 98 which is threaded into a plate 99 on the machine framework. Coil springs 100 and 101 urge the two parts of the nut 97 to closed position as shown in Fig. 7. So arranged, when the holder 83 is rotated in a clockwise direction looking down upon the holder from the front of the machine, Fig. 1, the platform will be rotated with the holder and the rod 95, which will cause the platform to move downwardly in the holder. The arrangement is such and the pitch of the threads 96 on rod 95 and in the split nut 97 are such, that when welding of the packing units is begun, the platform is near the top of the holder 83, and as one weld is completed, the holder is rotated in a clockwise direction as previously mentioned through an angle of 120°, which will rotate the platform and its rod 95 and will cause the platform to be moved downwardly in the holder a distance sufficient to permit another packing unit to be placed on top of the packing in the holder in the proper position relative to the packing unit which has just been welded. The turntable 85 has a triangular shaped recess 102 which receives the platform 94 when it is in its lowermost position, and so that the top of the platform will not be higher than the top of the turntable 85. When a packing section consisting of that number of packing units which will fill the holder 83, or any desired lesser number, have been welded together, and the platform is in its lowermost position, the section may be removed from the holder by moving the latch 90 to open position and rotating the holder about its pivot 84 to a horizontal position as shown in Fig. 4, and removing the section therein by pushing it out the bottom of the holder. It will be understood that the vertically inclined lips 25 on the packing units will make it difficult to move the section toward the upper end of the holder.

Means are utilized to provide a quick return of the platform 94 from its lowermost position to its uppermost position. As shown, each part of the split nut 97 has a part of a U-shaped recess 103, into which the U-shaped lower end of a spreading member 104 is adapted to be forced by a lever having an arm 105 and a handle 106 which is pivotally mounted by pin 107 between spaced bosses 108 fixed to the plate 99. The outer end of the lever arm 105 is disposed in a slot 109 in the upper portion of the spreading member 104 and the jaw at the outer end of the lever arm 105 receives a pin 110 which extends through the upper part of the spreading member and the slot 109 therein. A locking bolt 111 having a rack 112 on its upper side which engages with teeth 113 on the central part of the lever, has a forked inner end which receives projection 114 on the two parts of the split nut 97 to hold the nut positively in closed position. When the lever is in the position shown in Fig. 2 with the operating handle 106 in its lowermost position, the spreading member 104 will be withdrawn from engagement with the nut and the locking bolt 111 will have been forced into locking position. When the lever handle 106 is moved to its uppermost position, the locking bolt will first be withdrawn to open position as shown in dotted lines in Fig. 7, after which the spreading member 104 will be forced into the recess 103 and will spread apart the parts of the nut 97. The platform will then move upwardly under the influence of the weight 115 on cables 116 which run over pulleys 117 and 118 and which are attached to an extension 119 which is rotatably mounted on the lower end of the platform rod 95. When the platform has moved to its desired uppermost position, the lever handle 106 is moved downwardly again, the spreading member 104 will be withdrawn from the recess in the lock nut and the locking bolt will be moved inwardly to lock the two parts of the nut together.

Figure 13:
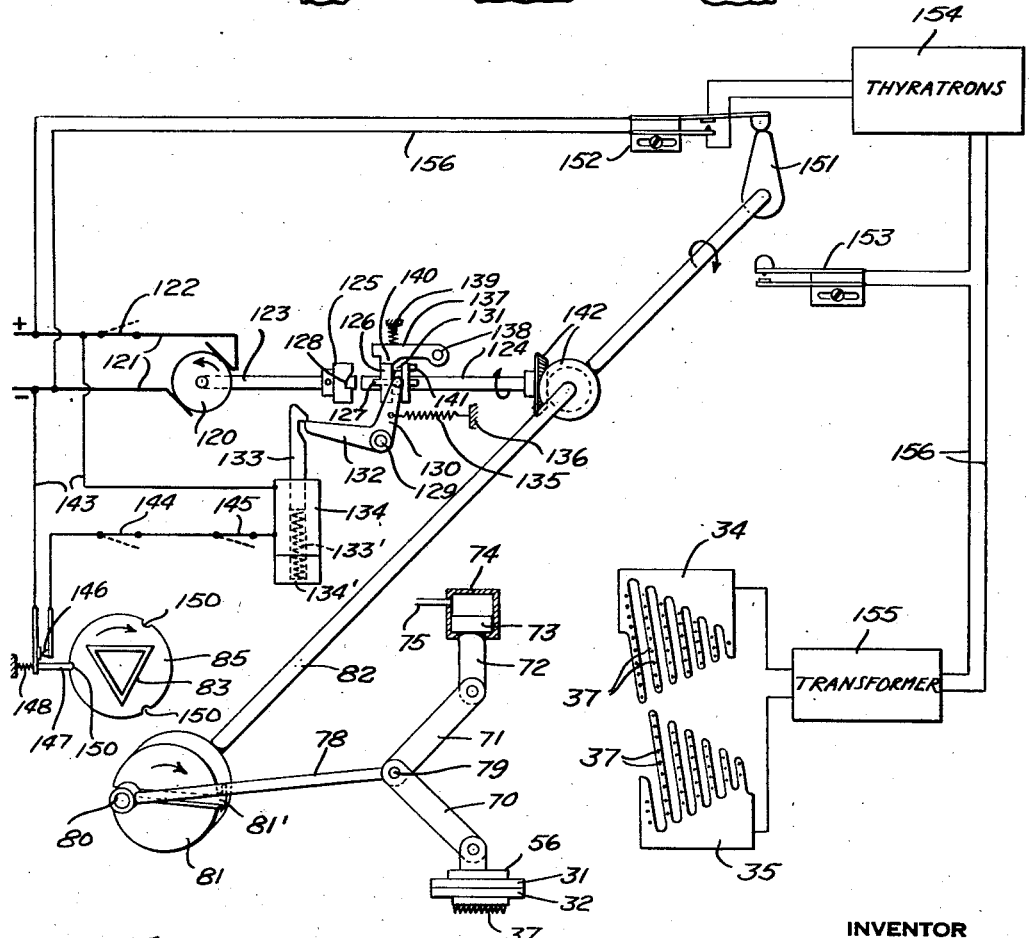
Fig. 13 is a wiring diagram showing the relationship of the welding machine parts thereto.

The welding head is actuated by an electric motor 120, Fig. 13, which is connected in motor circuit 121 controlled by a manual switch 122. The motor 120 runs continuously during the operation of the welding machine and continually drives a shaft 123 which may be connected to and disconnected from a shaft 124 by suitable clutch means arranged to drive the shaft 124 for one complete revolution when a weld is to be made, and then to disconnect the shaft 124 until the next weld is to be made. The clutch shown comprises a member 125 fixed on the end of shaft 123 and a member 126 slidably mounted on the adjacent end of shaft 124 which has oppositely disposed lugs 127 which are received in notches 128 in the member 125 and so arranged that the member 126 is driven only when the shaft 123 is rotated in a clockwise direction when looking at the right-hand end of shaft 123 in Fig. 13. Clutch member 126 is moved axially on the shaft 124 by a bell-crank lever pivoted at 129 and having an arm 130 the outer end of which has a pin which is received in a peripheral groove 131 of the clutch member, and an arm 132 the outer end of which is received in a notch in one end of the core 133 of a solenoid 134. The core 133 is urged to its deenergized position by a coil spring 133' which reacts against a stationary member 134'. The core and lever arm 132 are so positioned with respect to each other that the lever arm is released just before the core reaches its lowermost position. Clutch member 126 is urged to disengaged position by a coil spring 135 having one end connected to arm 130 of the bell-crank lever and the other end connected to a fixed part 136 of the machine. A detent 137 pivoted at 138 and urged into engagement with the clutch member 126 by a spring 139, has a projection 140 which engages the right-hand end of the member 126 as seen in Fig. 13, when the clutch is engaged and ensures that it will remain in that position until the shaft 124 makes one complete revolution, when the lug 141 on clutch member 126 will come in contact with the projection 140 and move the detent upwardly and permit spring 135 to move member 126 to the right, Fig. 13, thus disengaging the clutch. Shaft 124 drives shaft 82 at the same rate of speed through bevel gears 142 of the same diameter, so that one revolution of shaft 124 will rotate shaft 82 one revolution and will move the electrodes into contact with the work for the weld and then permit them to be withdrawn from contact with the work preparatory for the next weld on the next packing unit.

Solenoid 134 is connected in series with a solenoid circuit 143 which is in parallel with the motor circuit 121. Also in series in circuit 143 are two hand operated switches 144 and 145 disposed at opposite sides of the table 86. Also in series with the solenoid 134 is a switch 146 which is actuated by a pin 147 urged toward the turntable 85 by a spring 148. The switch 146 and its actuating mechanism are enclosed in a housing 149 at the left-hand side of the turntable 85 as seen in Fig. 1. The periphery of the turntable is provided with three notches 150 located at 120° intervals, and these notches and the pin 147 are located so that the pin will enter a notch and the switch 146 will be closed only when the holder 83 on turntable 85 is in a proper position for a weld to be effected, that is, with the points on the uppermost packing unit which are to be welded, in exact vertical alignment with the electrodes 37.

Shaft 82 carries a cam 151 which operates two switches 152 and 153 which are in series with the welding circuti 156. Switch 152 which is located in the circuit between the source of current and the thyratrons 154, is normally closed but is held in open position when the welding head is at rest in its uppermost position, between welds. Switch 153 which is located in the welding circuit between the thyratrons 154 and the transformer 155, is normally open excepting when the weld is made and is located with respect to the travel of the cam 151 so that the switch will be closed at the time the electrodes 37 are in contact with the work.

From the foregoing disclosure, the operation will be apparent. Let it be assumed that the holder 83 is latched in vertical position and the platform 94 is in its uppermost position, that is, in a position to weld the first two packing units 20 together. A stack of packing units are placed in a convenient position near the operator of the machine, and these units are stacked with their pyramids all in vertical alignment. A packing unit is placed in the holder and on the platform, and the holder is rotated 120° manually, by the operator moving the right hand handle 89 from right to left as seen in Fig. 1, or any other handle 89 in the same direction with respect to the axis of the holder, and the platform 94 is lowered a distance equal to the thickness of a unit until pin 147 enters a notch 150 and retains the holder in correct position for welding. The second packing unit is placed in the holder and on top of the first unit in the same position relative to the operator as the first unit, but since the holder has been rotated 120°, the pattern of the second unit will be rotated 120° with respect to the first unit and the points of junction 24 of the second unit will be in contact with the apices of the pyramids of the first unit in the manner previously described, and as shown in Figs. 6 and 9. With motor 120 running, the operator touches and closes switches 144 and 145 with his hands, which causes solenoid 134 to be energized and its core 133 to be moved downwardly against the pressure of coil spring 133' as seen in Fig. 13, thereby moving the bell-crank lever in a counter-clockwise direction and moving clutch member 126 into engagement with clutch member 125 and permitting the detent 137 to move downwardly and to retain the clutch member 125 in engaged position. By the time the clutch members 125 and 126 are engaged with the detent 137 in locking position, the core 133 of the solenoid will have released the bell-crank lever and the core 133 will have returned to its deenergized position. The rotation of shaft 123 will thus rotate shaft 124 which will rotate shaft 82, move cam 151, close switch 152, and cause the welding head to move downwardly toward the work. When the electrodes are in engagement with the points of junction 24 of the second packing unit in the holder 83, cam 151 will be in position to close switch 153 and cause the welding current to flow through the electrodes 37 and through those portions of the second packing unit which lie between the electrodes on the die block 34 and those on the die block 35. The greatest concentration of welding current will occur at the points of junction 24 and cause the metal of the unit at these points to become molten momentarily and to fuse with the metal of the first unit at the apices of the pyrimids thereof, thus welding the second unit to the first unit. Thereafter, further rotation of shaft 82 will carry cam 151 out of contact with switch 153 and will permit that switch to open and cut off the flow of welding current to the electrodes. Simultaneously, the welding head will be moved upwardly out of cotnact with the work by the action of supporting springs 68, and as the head nears its uppermost position, lug 141 on the clutch member 126 will engage detent 137 and move it upwardly and permit spring 135 to disengage the clutch, whereupon the shaft 124 and 82 will stop rotating and cam 151 will have opened the switch 152. The work holder 83 is then rotated another 120° step until the pin 147 enters the next notch 150 and the platform 94 is moved downwardly another step. The operator then places the third packing unit in the holder on top of the second unit in the same manner the second unit was placed on the first unit with the pattern of the third unit rotated at an angle of 120° to the pattern of the second unit and with the points of junction 24 of the third unit in contact with the apices of the pyrimds 23 of the second unit. The operator then closes both switches 144 and 145 and the operation previously described in repeated to effect the welding of the third unit to the second unit. This procedure is repeated until the desired number of packing units have been welded together, or until the holder 83 is filled and the platform 94 is in its lowermost position. Latch 90 is moved to open position, the holder is moved to horizontal position, the packing section therein is pushed out the lower open end of the holder, and the holder is returned to its vertical position. Thereafter, handle 106 is moved to its upper position to release locking bolt 111, to spread apart the split nut 97, and to release the platform rod 95 and permit it to move to its uppermost position under the influence of the weight 115. Lever handle 106 is then moved to its lower position which permits the parts of the split nut to move toward each other and to be retained in closed position by the locking bolt 111. The machine is now ready to begin the welding of another packing section in the manner previously described.

Figure 14:
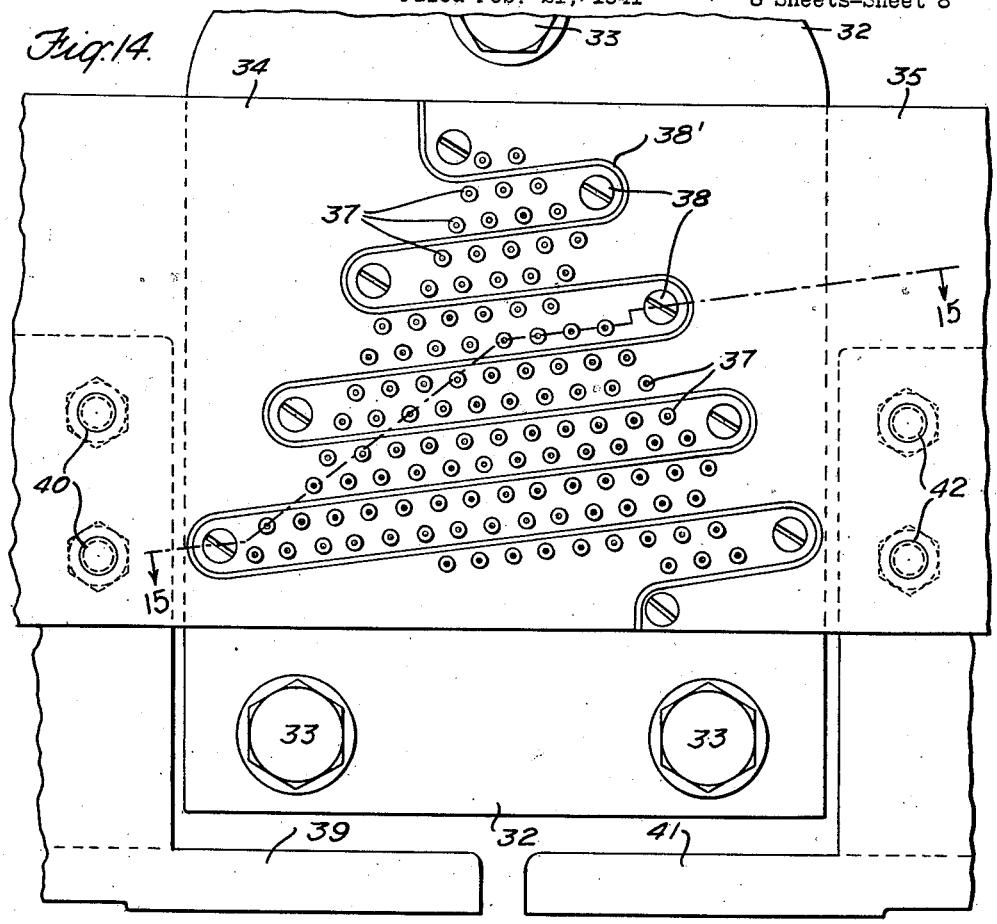
Fig. 14 is a plan view of another form of welding head embodying the invention.
Figure 15:
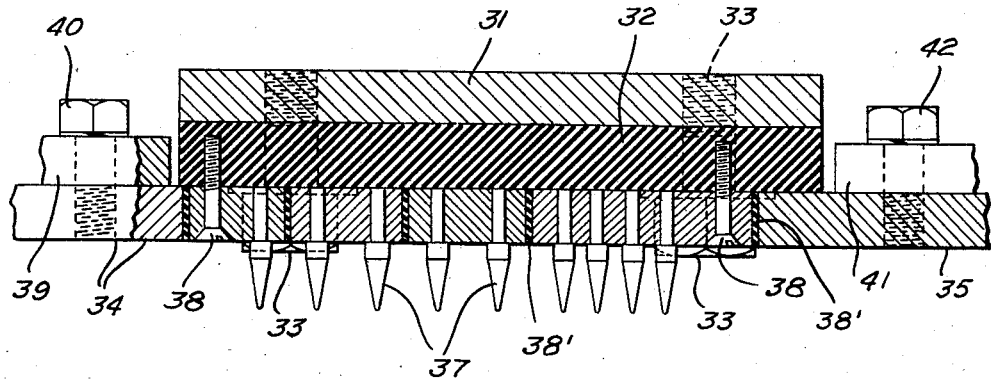
Fig. 15 is a vertical sectional view taken on line 15—15 of Fig. 14.

The form of welding head shown in Figs. 14 and 15 is the same essentially as the welding head previously described, excepting that the electrodes 37 are arranged in groups of double rows instead of single rows. In Figs. 14 and 15, the electrodes in alternate groups of two rows are connected to one side of the welding circuit and the electrodes in the other groups are connected to the other side of the circuit. With this arrangement, each row of electrodes is adjacent another row which is connected to the other side of the welding circuit, excepting for the lowermost row as shown in Fig. 14. Welding with the head shown in Figs. 14 and 15 will be accomplished in essentially the same manner as with the welding head disclosed previously.

From the foregoing it will be perceived that the invention provides apparatus for welding simultaneously a multiplicity of substantially uniformly spaced points. Stainless steel wire gauze packing units of the type disclosed herein, have been welded together satisfactorily at 117 different points simultaneously in accordance with the invention. As previously mentioned however, the invention is not limited to the welding of this particular packing material or of this shape of packing material, but is applicable generally to the spot welding of all metals and metallic materials which are capable of being spot welded. Any desired number of points within practical limits may be welded at the same in accordance with the invention. Welding heads embodying the invention may be used with forms and types of welding apparatus other than the particular machine disclosed.

Inasmuch as changes may be made in the form, location and relative arrangement of the several parts of the apparatus disclosed without departing from the principles of the invention, it will be understood that the invention is not to be limited excepting by the scope of the appended claims.

What is claimed is:

1. A welding head for electric resistance welding apparatus, comprising a die block adapted to be connected to one side of a welding circuit, another die block adapted to be connected to the other side of said circuit, each die block having spaced projections adapted to be positioned intermediate the projections on the other block in insulated relationship, and at least one electrode on those projections which lie between other projections.

2. A welding head for electric resistance welding apparatus comprising a die block adapted to be connected to one side of a welding circuit, another die block adapted to be connected to the other side of said circuit, each die block having spaced projections adapted to be positioned intermediate the projections on the other block in insulated relationship, and a single row of spaced electrodes on each of those projections which lie between other projections, the electrodes being substantially uniformly distributed on the welding head.

3. A welding head for electric resistance welding apparatus comprising a die block adapted to be connected to one side of a welding circuit, another die block adapted to be connected to the other side of said circuit, each die block having spaced projections adapted to be positioned intermediate the projections on the other block in insulated relationship and a plurality of spaced rows of spaced electrodes on each of those projections which lie between other projections, the electrodes being substantially uniformly distributed on the welding head.

4. A welding head for electric resistance welding apparatus comprising a die block adapted to be connected to one side of a welding circuit, another die block adapted to be connected to the other side of said circuit, each die block having spaced projections adapted to be positioned intermediate the projections on the other block in insulated relationship and two spaced rows of spaced electrodes on each of those projections which lie between other projections, the electrodes being substantially uniformly distributed on the welding head.

5. A welding head for electric resistance welding apparatus comprising a die block adapted to be connected to one side of a welding circuit, another die block adapted to be connected to the other side of said circuit, each die block having spaced projections adapted to be positioned intermediate the projections on the other block in insulated relationship, and electrodes on each projection which lies between other projections, the electrodes on said head being distributed subtsantially uniformly in spaced relationship.

6. Apparatus for electric resistance welding to each other in superposed relationship, units of capillary material, each having a pattern of integral, spaced, raised portions, with the upper parts of the raised portions on one unit adapted to be welded to the parts intermediate the raised portions of a superposed unit, the raised portions being substantially uniformly distributed on the units and centered with respect to the geometrical center of the units, comprising a holder to receive the units to be welded, said holder being tubular in form and having substantially the same transverse cross-sectional configuration as the units to be welded, a platform movable within the holder and adapted to support the units in the holder, a welding circuit, a welding head having a plurality of electrodes arranged to engage the parts of the units to be welded which are intermediate the raised portions thereof, means for connecting some of the electrodes to one side of the welding circuit and others to the other side of said circuit, the electrodes being disposed so that those connected to one side of the welding circuit are adjacent to but are electrically insulated from electrodes connected to the other side of the circuit, means for actuating the welding head to move it toward and from the units to be welded, means for rotating the holder between welds to bring the units therein to the next succeeding welding position, and means for moving the platform in a direction away from the welding head between welds a distance sufficient to provide space in the holder for the next unit to be welded.

7. Apparatus for electric resistance welding to each other in superposed relationship, units of capillary material, each having a pattern of integral, spaced, raised portions, with the upper parts of the raised portions on one unit adapted to be welded to the parts intermediate the raised portions of a superposed unit, the raised portions being substantially uniformly distributed on the units and centered with respect to the geometrical center of the units, comprising a holder to receive the units to be welded, said holder being tubular in form and having substantially the same transverse cross-sectional configuration as the units to be welded, a platform movable within the holder and adapted to support the units in the holder, a welding circuit, a welding head having a plurality of electrodes arranged to engage the parts of the units to be welded which are intermediate the raised portions thereof, means for connecting some of the electrodes to one side of the welding circuit and others to the other side of said circuit, the electrodes being disposed so that those connected to one side of the welding circuit are adjacent to but are electrically insulated from electrodes connected to the other side of the circuit, means for actuating the welding head to move it toward and from the units to be welded, means for rotating the holder between welds to bring the units therein to the next succeeding welding position, and means actuated by rotation of the holder for moving the platform in a direction away from the welding head between welds a distance sufficient to provide space in the holder for the next unit to be welded.

8. Apparatus for electric resistance welding to each other in superposed relationship, units of capillary material, each having a pattern of integral, spaced, raised portions, with the upper parts of the raised portions on one unit adapted to be welded to the parts intermediate the raised portions of a superposed unit, the raised portions being substantially uniformly distributed on the units and centered with respect to the geometrical center of the units, comprising a holder to receive the units to be welded, said holder being tubular in form and having substantially the same transverse cross-sectional configuration as the units to be welded, a platform movable within the holder and adapted to support the units in the holder, a welding circuit, a welding head having a plurality of electrodes arranged to engage the parts of the units to be welded which are intermediate the raised portions thereof, means for connecting some of the electrodes to one side of the welding circuit and others to the other side of said circuit, the electrodes being disposed so that those connected to one side of the welding circuit are adjacent to but are electrically insulated from electrodes connected to the other side of the circuit, means for actuating the welding head to move it toward and from the units to be welded, means for rotating the holder between welds, means for retaining the holder in position for a weld, and electric switch means actuated by said retaining means.

9. Apparatus for electric resistance welding to each other in superposed relationship equilateral triangular-shaped units of capillary material, each having a pattern of integral, spaced, raised portions, with the upper parts of the raised portions on one unit adapted to be welded to the parts intermediate the raised portions of a superposed unit, the raised portions being substantially uniformly distributed on the units and centered with respect to the geometrical center of the units, comprising a holder to receive the units to be welded, said holder being tubular in form and having an equilateral triangular transverse cross-sectional configuration of substantially the same size as the units to be welded, a platform movable within the holder and adapted to support the units in the holder, a welding circuit, a welding head having a plurality of electrodes arranged to engage the parts of the units to be welded which are intermediate the raised portions thereof, means for connecting some of the electrodes to one side of the welding circuit and others to the other side of said circuit, the electrodes being disposed so that those connected to one side of the welding circuit are adjacent to but are electrically insulated from electrodes connected to the other side of the circuit, means for actuating the welding head to move it toward and from the units to be welded, means for rotating the holder through an angle of approximately 120° between welds, means for retaining the holder in correct position for a weld, said head actuating means comprising a driving shaft, means for driving said shaft, a driven shaft, clutch means between said shafts, a solenoid for engaging said clutch means, electric switch means in series with said solenoid and associated with said retaining means in such manner that the switch means is closed only when the holder is in correct position for welding, means associated with said clutch means for disengaging the clutch means automatically after a weld has been made and the welding head is withdrawn from said article holding means, and means for closing the welding circuit automatically at the time a weld is to be made and for opening the circuit upon completion of the weld.

10. A welding head for electric resistance welding apparatus, comprising a die block adapted to be connected to one side of a welding circuit, another die block adapted to be connected to the other side of said circuit, each die block having spaced, elongated projections adapted to be positioned intermediate the spaced, elongated projections on the other block in insulated relationship therewith, and a plurality of spaced electrodes on those projections which lie between other projections, the electrodes being substantially uniformly distributed on the welding head.

11. A welding head for electric resistance welding apparatus, comprising a die block adapted to be connected to one side of a welding circuit, another die block adapted to be connected to the other side of said circuit, each die block having spaced, elongated projections adapted to be positioned intermediate the spaced, elongated projections on the other block in insulated relationship therewith, and a plurality of spaced electrodes on those projections which lie between other projections, the electrodes being substantially uniformly distributed on the welding head and arranged substantially in the form of an equilateral triangle.

12. A welding head for electric resistance welding apparatus, comprising a die block adapted to be connected to one side of a welding circuit, another die block adapted to be connected to the other side of said circuit, each die block having spaced, elongated projections adapted to be positioned intermediate the spaced, elongated projections on the other block in insulated relationship therewith, and a plurality of spaced electrodes on those projections which lie between other projections, the electrodes being substantially uniformly distributed on the welding head and arranged substantially in the form of an equilateral triangle, each side of said triangle being formed of electrodes on a plurality of said projections.

13. Apparatus for electric resistance welding metallic articles together in superposed relationship, comprising a holder to receive the articles to be welded, said holder being tubular in form and having substantially the same transverse cross-sectional configuration as the articles to be welded, a platform movable axially in the holder, a welding circuit, a welding head, means for actuating the welding head to move it toward and from the articles to be welded, means for rotating the holder about its longitudinal axis between welds to bring the articles therein to the next succeeding welding position, means for retaining the holder in position for a weld, and electric switch means actuated by said retaining means.

14. Apparatus for electric resistance welding metallic articles together in superposed relationship, comprising a holder to receive the articles to be welded, said holder being tubular in form and having substantially the same transverse cross-sectional configuration as the articles to be welded, a platform movable axially in the holder, a welding circuit, a welding head, means for actuating the welding head to move it toward and from the articles to be welded, means for rotating the holder about its longitudinal axis between welds to bring the articles therein to the next succeeding welding position, and means actuated by rotation of the holder for moving the platform in a direction away from the welding head between welds a distance sufficient to provide space in the holder for the next unit to be welded.

15. Apparatus for electric resistance welding metallic articles together in superposed relationship, comprising a holder to receive the articles to be welded, said holder being tubular in form and having substantially the same transverse cross-sectional configuration as the articles to be welded, a platform movable axially in the holder, a welding circuit, a welding head, means for actuating the welding head to move it toward and from the articles to be welded, means for rotating the holder about its longitudinal axis between welds to bring the articles therein to the next succeeding welding position, means operative by rotation of the holder for moving the platform in a direction away from the welding head between welds a distance sufficient to provide space in the holder for the next unit to be welded, means for releasing said last-mentioned means from its operative position, and means for quickly returning the platform in a direction toward the welding head upon the release of the means operative by rotation of the holder.

16. Apparatus for electric resistance welding metallic articles together in superposed relationship, comprising a holder to receive the articles to be welded, said holder being tubular in form and having substantially the same transverse cross-sectional configuration as the articles to be welded, a platform movable axially in the holder, a welding circuit, a welding head, means for actuating the welding head to move it toward and from the articles to be welded, holder mounting means for mounting the holder for movement from its welding position when the platform has been withdrawn substantially from the holder to a position at an angle to the welding position to allow withdrawal of the welded articles from the end thereof opposite the welding head end, and means for retaining the holder in welding position.

17. Apparatus for electric resistance welding to each other in superposed relationship, units of capillary material, each having a pattern of integral, spaced, raised portions, with the upper parts of the raised portions on one unit adapted to be welded to the parts intermediate the raised portions of a superposed unit, the raised portions being substantially uniformly distributed on the units and centered with respect to the geometrical center of the units, comprising a holder to receive the units to be welded, said holder being tubular in form and having substantially the same transverse cross-sectional configuration as the units to be welded, a platform movable within the holder and adapted to support the units in the holder, a welding circuit, a welding head having a plurality of electrodes arranged to engage the parts of the units to be welded which are intermediate the raised portions thereof, means for connecting some of the electrodes to one side of the welding circuit and others to the other side of said circuit, the electrodes being disposed so that those connected to one side of the welding circuit are adjacent to but are electrically insulated from electrodes connected to the other side of the circuit, means for actuating the welding head to move it toward and from the units to be welded, means for rotating the holder between welds, and means for retaining the holder in position for a weld.

18. Apparatus for electric resistance welding to each other in superposed relationship equilateral triangular-shaped units of capillary material, each having a pattern of integral, spaced, raised portions, with the upper parts of the raised portions on one unit adapted to be welded to the parts intermediate the raised portions of a superposed unit, the raised portions being substantially uniformly distributed on the units and centered with respect to the geometrical center of the units, comprising a holder to receive the units to be welded, said holder being tubular in form and having an equilateral triangular transverse cross-sectional configuration of substantially the same size as the units to be welded, a platform movable within the holder and adapted to support the units in the holder, a welding circuit, a welding head having a plurality of electrodes arranged to engage the parts of the units to be welded which are intermediate the raised portions thereof, means for connecting some of the electrodes to one side of the welding circuit and others to the other side of said circuit, the electrodes being disposed so that those connected to one side of the welding circuit are adjacent to but are electrically insulated from electrodes connected to the other side of the circuit, means for actuating the welding head to move it toward and from the units to be welded, means for rotating the holder through an angle of approximately 120° between welds, and means for retaining the holder in position for a weld.

19. Apparatus for electric resistance welding metallic articles together in superposed relationship, comprising a holder to receive the articles to be welded, said holder being tubular in form and having substantially the same transverse cross-sectional configuration as the articles to be welded, a platform movable axially in the holder, a welding circuit, a welding head, means for actuating the welding head to move it toward and from the articles to be welded, means for rotating the holder about its longitudinal axis between welds to bring the articles therein to the next succeeding welding position, means for retaining the holder in correct position for a weld, said head actuating means comprising a driving shaft, means for driving said shaft, a driven shaft, clutch means between said shafts, a solenoid for engaging said clutch means, electric switch means in series with said solenoid and associated with said retaining means in such manner that the switch means is closed only when the holder is in correct position for welding, means associated with said clutch means for disengaging the clutch means automatically after a weld has been made and the welding head is withdrawn from said article holding means, and means for closing the welding circuit automatically at the time a weld is to be made and for opening the circuit upon completion of the weld.

20. Apparatus for electric resistance welding metallic articles together at a multiplicity of substantially uniformly spaced points simultaneously, comprising a multiplicity of electrodes disposed in substantially uniformly spaced relationship and arranged in a plurality of adjacent, substantially parallel rows, means for bringing all the electrodes and one side only of one of said articles into contact, means for connecting the electrodes in certain of said rows to one side of a welding circuit, means for connecting the electrodes in the rows intermediate said certain rows to the other side of a welding circuit, and means for insulating the electrodes in said certain rows from the electrodes in said other rows.

LESLIE B. BRAGG.